(12) United States Patent
Davis et al.

(10) Patent No.: US 11,674,548 B2
(45) Date of Patent: Jun. 13, 2023

(54) LOW PROFILE ROTATING BEARING CENTERING SPRING

(71) Applicant: Raytheon Technologies Corporation, Farmington, CT (US)

(72) Inventors: Todd A. Davis, Tolland, CT (US); Paul R. Hanrahan, Farmington, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 320 days.

(21) Appl. No.: 16/913,019

(22) Filed: Jun. 26, 2020

(65) Prior Publication Data

US 2021/0404480 A1    Dec. 30, 2021

(51) Int. Cl.
*F16C 27/04* (2006.01)
*F01D 25/16* (2006.01)
*F16C 35/077* (2006.01)

(52) U.S. Cl.
CPC ............ *F16C 27/04* (2013.01); *F01D 25/164* (2013.01); *F16C 35/077* (2013.01); *F16C 2360/23* (2013.01)

(58) Field of Classification Search
CPC ........ F16C 27/04; F16C 35/077; F01D 25/04; F01D 25/164; F05D 2240/50
See application file for complete search history.

(56) References Cited

U.S. PATENT DOCUMENTS

| | | | |
|---|---|---|---|
| 4,693,616 A * | 9/1987 | Rohra ................... | F16C 27/045 384/99 |
| 8,182,156 B2 | 5/2012 | Kinnaird et al. | |
| 8,747,054 B2 | 6/2014 | Witlicki | |
| 9,702,404 B2 * | 7/2017 | Smedresman ........ | F16C 27/045 |
| 9,869,206 B2 * | 1/2018 | Von Berg .............. | F16C 27/045 |
| 10,001,028 B2 | 6/2018 | Ganiger et al. | |
| 10,138,757 B2 | 11/2018 | Witlicki et al. | |
| 10,161,264 B2 | 12/2018 | Husband et al. | |
| 10,352,193 B2 | 7/2019 | Smedresman et al. | |
| 10,400,819 B2 * | 9/2019 | Takaoka ................ | F16C 33/581 |
| 10,415,638 B1 | 9/2019 | Smedresman et al. | |
| 11,085,330 B2 * | 8/2021 | Pankratov ............. | F01D 25/183 |
| 11,193,535 B2 * | 12/2021 | Aury ....................... | F16C 33/08 |
| 2015/0233293 A1 * | 8/2015 | Grogg ..................... | F16F 1/025 248/562 |

OTHER PUBLICATIONS

European Search Report for European Application No. 21181450.4; dated Nov. 24, 2021; 8 pages.

* cited by examiner

*Primary Examiner* — James Pilkington
(74) *Attorney, Agent, or Firm* — Cantor Colburn LLP

(57) ABSTRACT

A bearing assembly of a gas turbine engine includes a bearing inner race, a bearing outer race located radially outboard of the bearing inner race and a plurality of bearing elements located between the bearing inner race and the bearing outer race. A centering spring is operably connected to and supports the bearing outer race. The centering spring is an annular structure including a base portion, a tip portion, and a plurality of beams extending axially between the base portion and the tip portion.

17 Claims, 3 Drawing Sheets

LOW PROFILE ROTATING BEARING CENTERING SPRING

BACKGROUND

Exemplary embodiments of the present disclosure pertain to the art of gas turbine engines, and in particular to bearing systems for gas turbine engines.

Engine architecture dictates where bearings and supports can be located to properly support the rotors, in an attempt to establish a compromise between key engine metrics. (Weight, cost, performance, engine length, part count, tip closures, etc). As engine sizes decrease some features are not photographically scalable—thereby requiring unique features to facilitate the implementation of key structures. Combining bearing compartments and having intershaft bearing compartments is one such example. In some configurations, a damper rod centering spring arrangement is utilized in the intershaft bearing compartment. There is room for development of a smaller, lighter and more manufactural centering spring arrangement.

BRIEF DESCRIPTION

In one embodiment, a bearing assembly of a gas turbine engine includes a bearing inner race, a bearing outer race located radially outboard of the bearing inner race and a plurality of bearing elements located between the bearing inner race and the bearing outer race. A centering spring is operably connected to and supports the bearing outer race. The centering spring is an annular structure including a base portion, a tip portion, and a plurality of beams extending axially between the base portion and the tip portion.

Additionally or alternatively, in this or other embodiments the centering spring includes a first stop at the tip portion to limit radially outward deflection of the centering spring and the bearing outer race connected thereto.

Additionally or alternatively, in this or other embodiments the centering spring includes a second stop at the base portion to limit radially outward deflection of the bearing outer race.

Additionally or alternatively, in this or other embodiments the bearing outer race is connected to the base portion via insertion of a first end of the bearing outer race into one or more slots defined in the base portion.

Additionally or alternatively, in this or other embodiments the bearing outer race is secured to the tip portion via one or more fasteners.

Additionally or alternatively, in this or other embodiments a thickness of the plurality of beams varies in one or more of a radial or circumferential direction along an axial length of the plurality of beams.

Additionally or alternatively, in this or other embodiments the bearing inner race and the bearing outer race independently rotate about an engine central longitudinal axis, connected to different engine spools.

In another embodiment, a shaft assembly of a gas turbine engine includes a first shaft located at and rotatable about an engine central longitudinal axis, and a second shaft concentric with the first shaft. A bearing assembly is supportive of the second shaft relative to the first shaft. The bearing assembly includes a bearing inner race located at the first shaft, a bearing outer race located radially outboard of the bearing inner race and located at the second shaft, and a plurality of bearing elements located between the bearing inner race and the bearing outer race. A centering spring is operably connected to and supports the bearing outer race. The centering spring is an annular structure including a base portion, a tip portion, and a plurality of beams extending axially between the base portion and the tip portion.

Additionally or alternatively, in this or other embodiments the centering spring includes a first stop at the tip portion to limit radially outward deflection of the centering spring and the bearing outer race connected thereto.

Additionally or alternatively, in this or other embodiments the centering spring includes a second stop at the base portion to limit radially outward deflection of the bearing outer race.

Additionally or alternatively, in this or other embodiments the bearing outer race is connected to the base portion via insertion of a first end of the bearing outer race into one or more slots defined in the base portion.

Additionally or alternatively, in this or other embodiments the bearing outer race is secured to the tip portion via one or more fasteners.

Additionally or alternatively, in this or other embodiments a thickness of the plurality of beams varies in one or more of a radial or circumferential direction along an axial length of the plurality of beams.

Additionally or alternatively, in this or other embodiments the first shaft and the second shaft are configured to independently rotate about the engine central longitudinal axis.

In yet another embodiment, a gas turbine engine includes a combustor and a turbine section driven by combustion gasses of the combustor. The turbine section includes a first shaft located at and rotatable about an engine central longitudinal axis, and a second shaft concentric with the first shaft. A bearing assembly is supportive of the second shaft relative to the first shaft. The bearing assembly includes a bearing inner race located at the first shaft, a bearing outer race located radially outboard of the bearing inner race and located at the second shaft, and a plurality of bearing elements located between the bearing inner race and the bearing outer race. A centering spring is operably connected to and supports the bearing outer race. The centering spring is an annular structure including a base portion, a tip portion, and a plurality of beams extending axially between the base portion and the tip portion.

Additionally or alternatively, in this or other embodiments the centering spring includes a first stop at the tip portion to limit radially outward deflection of the centering spring and the bearing outer race connected thereto.

Additionally or alternatively, in this or other embodiments the centering spring includes a second stop at the base portion to limit radially outward deflection of the bearing outer race.

Additionally or alternatively, in this or other embodiments the bearing outer race is connected to the base portion via insertion of a first end of the bearing outer race into one or more slots defined in the base portion.

Additionally or alternatively, in this or other embodiments a thickness of the plurality of beams varies in one or more of a radial or circumferential direction along an axial length of the plurality of beams.

Additionally or alternatively, in this or other embodiments the first shaft and the second shaft are configured to independently rotate about the engine central longitudinal axis.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
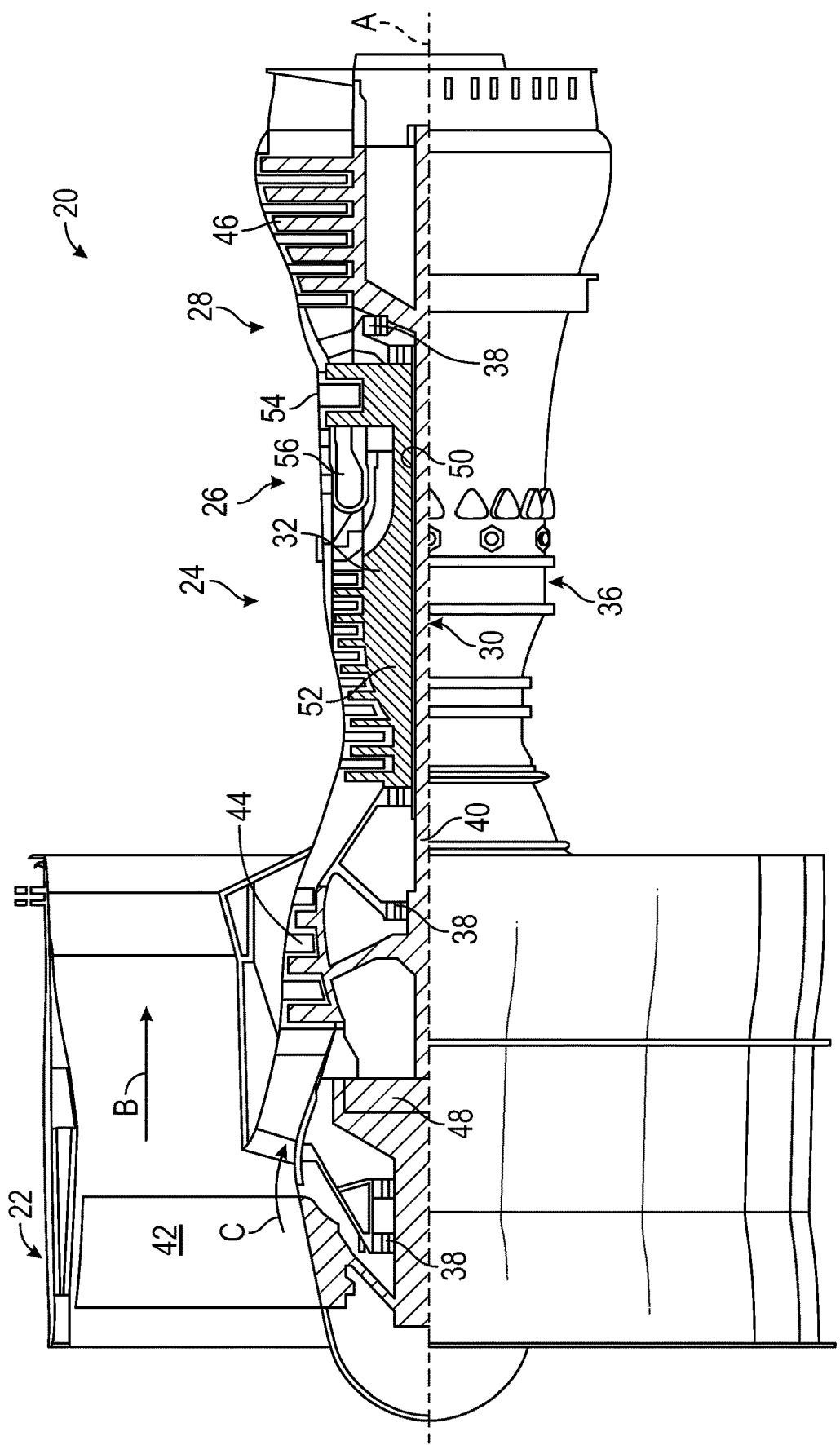
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

Figure 2:
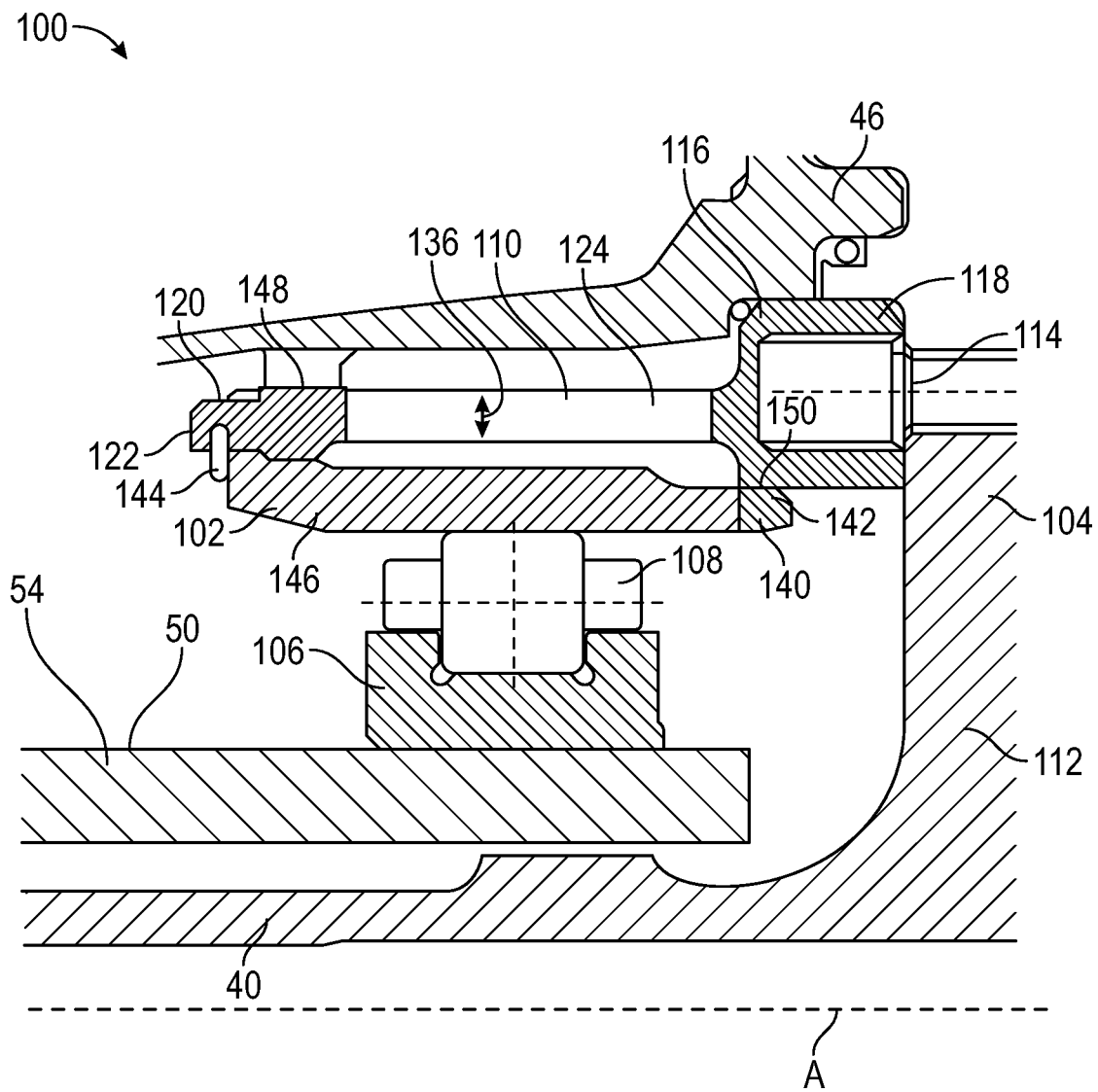
FIG. 2 is a partial cross-sectional view of an embodiment of a bearing assembly of a gas turbine engine.

Referring to FIG. 2 is a cross-sectional illustration of a bearing assembly 100 of a gas turbine engine 20. The bearing assembly 100 in some embodiments is defined radially between two rotating components of the gas turbine engine 20, for example, between the inner shaft 40 and the outer shaft 50 and components of the high pressure turbine 54 and the low pressure turbine 46. In some embodiments, the high pressure turbine 54 and the low pressure turbine 46 rotate in opposite directions about the engine central longitudinal axis A, and in other embodiments the high pressure turbine 54 and the low pressure turbine 46 co-rotate, or rotate the same direction about the engine central longitudinal axis A.

The bearing assembly 100 includes a bearing outer race 102 secured to, for example, a low pressure turbine rotor 104, and a bearing inner race 106 located radially inboard of the bearing outer race 102, and secured at the high pressure turbine 54, for example, at the outer shaft 50. One or more bearing elements 108 are located between the bearing outer race 102 and the bearing inner race 106.

The bearing outer race 102 is supported by a centering spring 110. The centering spring 110 extends circumferentially around the engine central longitudinal axis A. The low pressure turbine rotor 104 has a radially extending rotor arm 112. The centering spring 110 is secured to the rotor arm 112 via a plurality of fasteners, such as bolts 114.

Figure 3:
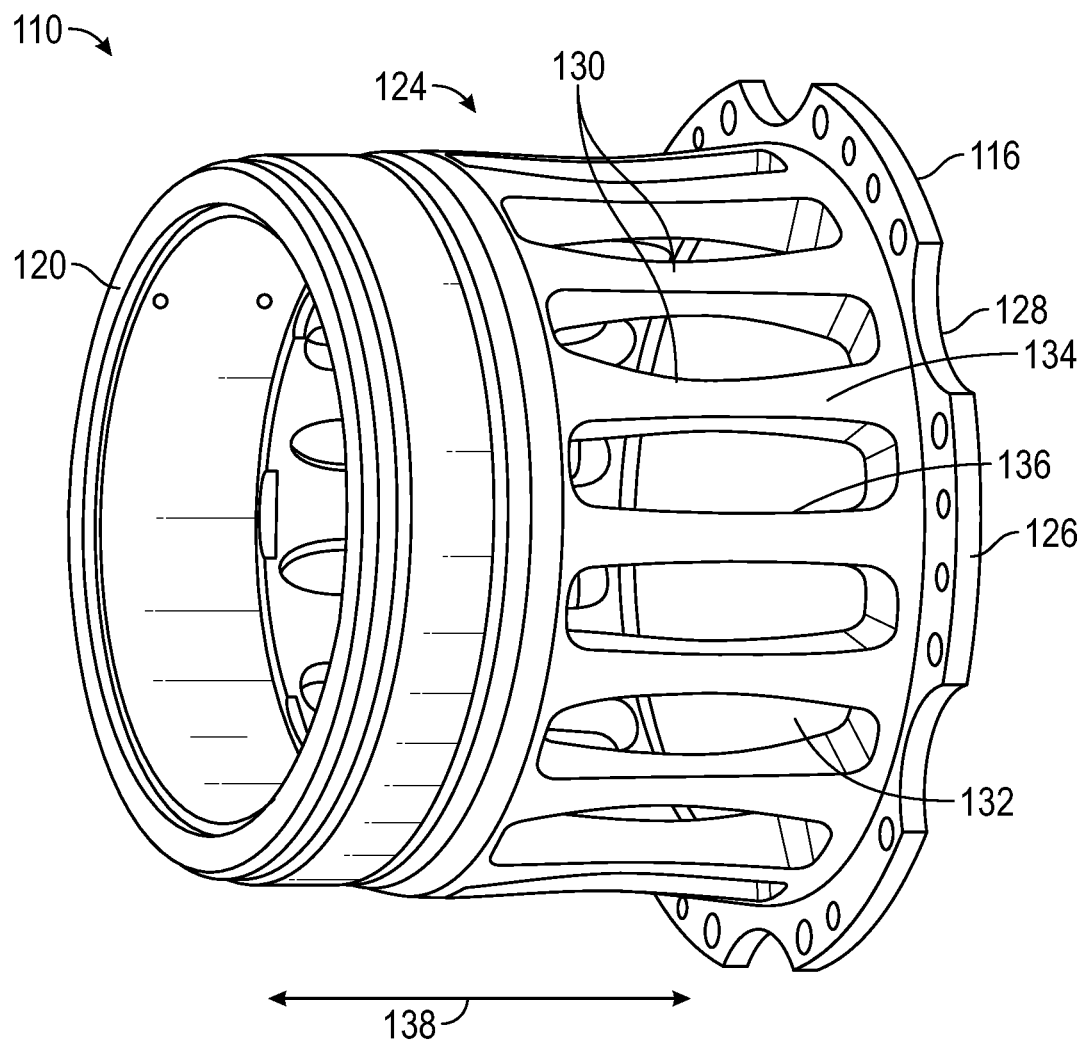
FIG. 3 is a perspective view of an embodiment of a centering spring.

The centering spring 110 is annular in shape and includes a base portion 116 at a first spring end 118, a tip portion 120 at a second spring end 122, and a body portion 124 extending between the base portion 116 and the tip portion 120. Referring to FIG. 3, the base portion 116 includes a radially extending base flange 126 which includes a plurality of flange openings 128 through which the bolts 114 are installed to secure the centering spring 110 to the rotor arm 112. The body portion 124 includes a plurality of axially-extending beams 130 separated by body openings 132. The configuration of the beams 130 defines a spring rate or flexibility of the centering spring 110 to react loads on the bearing outer race 102. In some embodiments, a circumferential thickness 134 and/or a radial thickness 136 of the beams 130 varies along an axial beam length 138. In some embodiments, the circumferential thickness 134 and/or the radial thickness 136 are at their minimums at or near a midpoint of the axial beam length 138.

Referring again to FIG. 2, the bearing outer race 102 is located radially inboard of the body portion 124. A first end 142 of the bearing outer race 102 extends at least partially into a locating slot 140 of a plurality of locating slots 140 to limit circumferential displacement of the bearing outer race 102 relative to the centering spring 110. Further, one or more fasteners such as clips or retaining rings 144 radially and axially secure a second end 146 of the bearing outer race 102 at the tip portion 120 of the centering spring 110.

The centering spring 110 includes one or more stops to modify the stiffness or spring rate of the centering spring 110 and bearing outer race 102 assembly during operation. A first stop 148 is located at the tip portion 120 of the centering spring 110 and is a radially outward protrusion from the tip portion 120 toward the low pressure turbine 46 thereby limiting radially outward deflection of the centering spring 110 and thus the bearing outer race 102. A second stop 150 is defined by the relative radial size of the first end 142 and the locating slots 140. The locating slots 140 limit radially outward movement of the bearing outer race 102 at the first end 142. When both the first stop 148 and the second stop 150 are engaged, the bearing outer race 102 is essentially a hard-mounted configuration.

The centering spring 110 configurations disclosed herein is a more manufacturable, cost effective centering spring design, relative to the typical prior art configurations. The centering spring 110 has a lower overall height and is a lighter and more space efficient arrangement. Given that there is no axial stress in the beams 130 (as there are in the centering spring damper rods) all of the material capability is used to support bearing deflections. This results in a more weight efficient overall structure of the centering spring 110.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A bearing assembly of a gas turbine engine, comprising:
    a bearing inner race;
    a bearing outer race located radially outboard of the bearing inner race;
    a plurality of bearing elements located between the bearing inner race and the bearing outer race; and
    a centering spring operably connected to and supporting of the bearing outer race, the centering spring being an annular structure including:
        a base portion;
        a tip portion; and
        a plurality of beams extending axially between the base portion and the tip portion;
    wherein the bearing outer race and the centering spring are configured to rotate about an engine central longitudinal axis; and
    wherein the centering spring includes a first stop at the tip portion to limit radially outward deflection of the centering spring and the bearing outer race connected thereto.

2. The bearing assembly of claim 1, wherein the centering spring includes a second stop at the base portion to limit radially outward deflection of the bearing outer race.

3. The bearing assembly of claim 1, wherein the bearing outer race is connected to the base portion via insertion of a first end of the bearing outer race into one or more slots defined in the base portion.

4. The bearing assembly of claim 1, wherein the bearing outer race is secured to the tip portion via one or more fasteners.

5. The bearing assembly of claim 1, wherein a thickness of the plurality of beams varies in one or more of a radial or circumferential direction along an axial length of the plurality of beams.

6. The bearing assembly of claim 1, wherein the bearing inner race and the bearing outer race independently rotate about the engine central longitudinal axis, connected to different engine spools.

7. A shaft assembly of a gas turbine engine, comprising:
    a first shaft disposed at and rotatable about an engine central longitudinal axis;
    a second shaft concentric with the first shaft; and
    a bearing assembly supportive of the second shaft relative to the first shaft, the bearing assembly including:
        a bearing inner race disposed at the first shaft;
        a bearing outer race located radially outboard of the bearing inner race and disposed at the second shaft;

a plurality of bearing elements located between the bearing inner race and the bearing outer race; and a centering spring operably connected to and supporting of the bearing outer race, the centering spring being an annular structure including:
- a base portion;
- a tip portion; and
- a plurality of beams extending axially between the base portion and the tip portion wherein the centering spring includes a first stop at the tip portion to limit radially outward deflection of the centering spring and the bearing outer race connected thereto.

8. The shaft assembly of claim 7, wherein the centering spring includes a second stop at the base portion to limit radially outward deflection of the bearing outer race.

9. The shaft assembly of claim 7, wherein the bearing outer race is connected to the base portion via insertion of a first end of the bearing outer race into one or more slots defined in the base portion.

10. The shaft assembly of claim 7, wherein the bearing outer race is secured to the tip portion via one or more fasteners.

11. The shaft assembly of claim 7, wherein a thickness of the plurality of beams varies in one or more of a radial or circumferential direction along an axial length of the plurality of beams.

12. The shaft assembly of claim 7, wherein the first shaft and the second shaft are configured to independently rotate about the engine central longitudinal axis.

13. A gas turbine engine, comprising:

a combustor; and a turbine section driven by combustion gasses of the combustor, the turbine section including:
- a first shaft disposed at and rotatable about an engine central longitudinal axis;
- a second shaft concentric with the first shaft; and
- a bearing assembly supportive of the second shaft relative to the first shaft, the bearing assembly including:
  - a bearing inner race disposed at the first shaft;
  - a bearing outer race located radially outboard of the bearing inner race and disposed at the second shaft;
  - a plurality of bearing elements located between the bearing inner race and the bearing outer race; and
  - a centering spring operably connected to and supporting of the bearing outer race, the centering spring being an annular structure including:
    - a base portion;
    - a tip portion; and
    - a plurality of beams extending axially between the base portion and the tip portion;

wherein the centering spring includes a first stop at the tip portion to limit radially outward deflection of the centering spring.

14. The gas turbine engine of claim 13, wherein the centering spring includes a second stop at the base portion to limit radially outward deflection of the bearing outer race.

15. The gas turbine engine of claim 13, wherein the bearing outer race is connected to the base portion via insertion of a first end of the bearing outer race into one or more slots defined in the base portion.

16. The gas turbine engine of claim 13, wherein a thickness of the plurality of beams varies in one or more of a radial or circumferential direction along an axial length of the plurality of beams.

17. The gas turbine engine of claim 13, wherein the first shaft and the second shaft are configured to independently rotate about the engine central longitudinal axis.

* * * * *